(12) United States Patent
Zhang et al.

(10) Patent No.: US 10,360,429 B2
(45) Date of Patent: Jul. 23, 2019

(54) CAPACITIVE FINGERPRINT SENSOR

(71) Applicant: SHENZHEN GOODIX TECHNOLOGY CO., LTD., Shenzhen (CN)

(72) Inventors: Mengwen Zhang, Shenzhen (CN); Chang Zhan, Shenzhen (CN); Tao Pi, Shenzhen (CN); Zhouqun Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 78 days.

(21) Appl. No.: 15/694,755

(22) Filed: Sep. 1, 2017

(65) Prior Publication Data

US 2018/0121699 A1 May 3, 2018

Related U.S. Application Data

(63) Continuation of application No. PCT/CN2016/103498, filed on Oct. 27, 2016.

(51) Int. Cl.
*G06K 9/28* (2006.01)
*G06K 9/00* (2006.01)

(52) U.S. Cl.
CPC .................... *G06K 9/0002* (2013.01)

(58) Field of Classification Search
CPC ...................................... G06K 9/0002
See application file for complete search history.

(56) References Cited

U.S. PATENT DOCUMENTS

| 9,465,973 | B1 | 10/2016 | Lin et al. | |
| 2016/0350577 | A1* | 12/2016 | Yang | G06K 9/00053 |
| 2017/0116452 | A1* | 4/2017 | Wang | G06K 9/0002 |
| 2018/0059856 | A1* | 3/2018 | Kim | G06F 3/0416 |

FOREIGN PATENT DOCUMENTS

| CN | 203964928 U | 11/2014 | |
| CN | 105426865 A | 3/2016 | |
| CN | 105740756 A | 7/2016 | |
| CN | 205507802 U | 8/2016 | |
| KR | 10-2010-0104551 A | 9/2010 | |
| WO | 2015096807 A1 | 7/2015 | |
| WO | WO-2015096807 A1 * | 7/2015 | G06K 9/0002 |

* cited by examiner

*Primary Examiner* — Brian Werner (57) ABSTRACT

Embodiments of the present disclosure hereinafter provide a capacitive fingerprint sensor. The capacitive fingerprint sensor includes: an integrator, a trigger and a base cancelling circuit; where the integrator is configured to store charges from a fingerprint capacitor to generate an output signal and transfer the output signal to the trigger, the trigger is configured to trigger the base cancelling circuit to generate a base cancelling signal and output the base cancelling signal to the integrator if the output signal exceeds a predetermined threshold, and the base cancelling signal is used to adjust the output signal of the integrator to fall within the predetermined threshold. In this way, the integrator is prevented from simply coming to saturation, and thus a dynamic range of the integrator is increased.

14 Claims, 6 Drawing Sheets

CAPACITIVE FINGERPRINT SENSOR

CROSS-REFERENCE TO RELATED APPLICATIONS

The present application is a continuation of international application No. PCT/CN2016/103498, filed on Oct. 27, 2016, which is hereby incorporated by reference in its entirety.

TECHNICAL FIELD

Embodiments of the present disclosure relate to the technical field of biological feature identification, and in particular, relate to a capacitive fingerprint sensor.

BACKGROUND

Fingerprints are invariable, unique and convenient, which thus provide a high-level identity security authentication. During the identity security authentication, fingerprint sensors are generally used as devices for automatically acquiring the fingerprints.

Based on the sensing mechanism, fingerprint sensors are mainly categorized into optical fingerprint sensors, semiconductor capacitive sensors, semiconductor thermistor sensor, semiconductor pressure sensitive sensors, ultrasound sensors and radio frequency (RF) sensors and the like.

Using a semiconductor capacitive fingerprint sensor as an example, on a "flat panel" where thousands of semiconductor devices are integrated, another face of a capacitor is formed when a finger is attached on the "flat panel". Since the surface of the finger is concave and convex and is not smooth, the convex points correspond to ridges and the concave points correspond to valleys, such that the actual distance from the convex points to the flat panel is different from the actual distance from the concave points to the flat panel. As such, values of the formed capacitances are different. The acquired values of the different capacitances are collected, and thus acquisition of fingerprints is complete.

However, an integration-type semiconductor capacitive fingerprint sensor generally includes an integrator. A base capacitor in a fingerprint capacitor, and a capacitor from a metal layer most proximate to the fingerprint to the system ground, that is, a parasitic capacitor may output a very great base signal at the integrator. The base signal is about 100 times of a valid signal corresponding to the fingerprint capacitor. Upon amplification by an amplifier, the base signal is far greater than the valid signal, such that the valid signal is relatively smaller. In addition, the amplified base signal may cause the integrator to simply come to saturation and cause an output dynamic range of the fingerprint sensor to become smaller.

SUMMARY

Embodiments of the present disclosure are intended to provide a capacitive fingerprint sensor, to at least solve the above technical problem in the related art.

To achieve the above objective, embodiments of the present disclosure provide a capacitive fingerprint sensor. The capacitive fingerprint sensor includes: an integrator, a trigger and a base cancelling circuit; where the integrator is configured to store charges from a fingerprint capacitor to generate an output signal and transfer the output signal to the trigger, the trigger is configured to trigger the base cancelling circuit to generate a base cancelling signal and output the base cancelling signal to the integrator if the output signal exceeds a predetermined threshold, and the base cancelling signal is used to adjust the output signal of the integrator to fall within the predetermined threshold to increase a dynamic range of the integrator.

In embodiments of the present disclosure, charges from the fingerprint capacitor are stored in the integrator such that an output signal is generated and transferred to the trigger, the trigger triggers the base cancelling circuit to generate a base cancelling signal and output the base cancelling signal to the integrator if the output signal exceeds a predetermined threshold, and the base cancelling signal adjusts the output signal of the integrator to fall within the predetermined threshold. In this way, the integrator is prevented from simply coming to saturation, and thus a dynamic range of the integrator is increased.

DETAILED DESCRIPTION

Practice of the present application is described in detail with reference to drawings and specific embodiments, such that the practice of addressing the technical problem using the technical means according to the present application and achieving the technical effects may be better understood and conducted.

Hereinafter, the present disclosure is further described illustratively.

Figure 1:
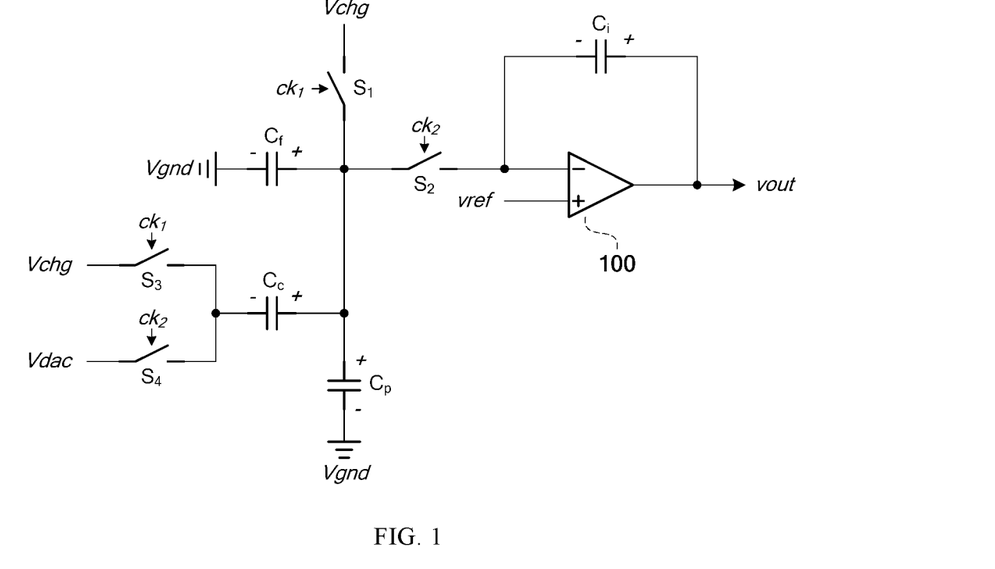
FIG. 1 is a schematic structural diagram of a circuitry of a typical fingerprint sensor.

FIG. 1 is a schematic structural diagram of a circuitry of a typical fingerprint sensor. As illustrated in FIG. 1, the fingerprint sensor includes an integrating capacitor $C_i$, switches $S_1$-$S_4$, and an amplifier 100. On-off states of the switches $S_1$ and $S_3$ are controlled by a first clock signal $ck_1$, on-off states of the switches $S_2$ and $S_4$ are controlled by a second clock signal $ck_2$, and the first clock signal $ck_1$ and the second clock signal $ck_2$ are two phase non-overlapping clock signals.

At an integration stage, the first clock signal $ck_1$ is a high phase whereas the second clock signal $ck_2$ is a low phase. In this case, the switches $S_2$ and $S_4$ are turned off whereas the switches $S_1$ and $S_3$ are turned on. Positive electrode plates of a fingerprint capacitor $C_f$ and a parasitic capacitor $C_p$ are connected to a power supply voltage $V_{chg}$. In this case, the power supply voltage $V_{chg}$ is applied to both terminals of a base cancelling capacitor $C_c$. Therefore, charges in the base cancelling capacitor $C_c$ are totally discharged. Afterwards, the second clock signal $ck_2$ is converted to a high phase whereas the first clock signal $ck_1$ is converted to a low phase. In this case, the switches $S_2$ and $S_4$ are turned on whereas the switches $S_1$ and $S_3$ are turned off. Positive electrode plates of the fingerprint capacitor $C_f$, the parasitic capacitor $C_p$ and the base cancelling capacitor $C_c$ are connected to a negative terminal of the amplifier 100, and a negative electrode plate of the base cancelling capacitor $C_c$ is connected to an output signal $V_{dac}$ of an external digital-to-analog converter (DAC). In this case, under a feedback effect, charges in the fingerprint capacitor $C_f$, the parasitic capacitor $C_p$ and the base cancelling capacitor $C_c$ are transferred to the integrating capacitor $C_i$, thereby completing an integration process, and accordingly a fingerprint detection is performed.

For ease of description, the power supply voltage $V_{chg}$, the output signal $V_{dac}$ of the external DAC, a reference voltage $V_{ref}$ and the voltage of an output signal $V_{out}$ in FIG. 1 are respectively named power supply voltage $V_c$, output signal $V_d$ of the external DAC, reference voltage $V_r$ and output signal $V_o$ of an integrator. A variation of an output signal $V_o$ in the primary integration may be represented by formula (1).

$$\Delta V_o = (V_r - V_c)\frac{C_f + C_p}{C_i} + (V_d - V_r)\frac{C_c}{C_i} \quad (1)$$

A capacitance of the parasitic capacitor $C_p$ is generally 10 to 100 times of that of the fingerprint capacitor $C_f$. Therefore, if the impact caused by the parasitic capacitor $C_p$ is not cancelled, the integrator may reach saturation before acquiring a desired signal amount. As a result, a dynamic range of a circuitry of the fingerprint sensor is small.

Therefore, to cancel the impact caused by the parasitic capacitor $C_p$, the base cancelling capacitor $C_c$ is configured in the circuitry of the fingerprint sensor as illustrated in FIG. 1. The impact caused by the parasitic capacitor $C_p$ may be cancelled by adjusting the output signal $V_d$ of the external DAC that is provided to the base cancelling capacitor $C_c$. The output signal $V_d$ of the external DAC that is used to cancelling the impact caused by the parasitic capacitor $C_p$ may be obtained based on formula (2).

$$V_d = V_r \frac{C_c - (C_f + C_p)}{C_c} + V_c \frac{C_f + C_p}{C_c} \quad (2)$$

According to formula (2), due to uncertainty of the parasitic capacitor $C_p$ and variations of the reference voltage $V_r$ with the process voltage temperature (PVT), an accurate value of the output signal $V_d$ of the external DAC may be acquired based on experiences and tests. Therefore, the base signal may not be thoroughly cancelled. That is, the base signal of the fingerprint sensor may not be cancelled accurately.

In another aspect, because the output dynamic range of the circuitry is small and the base signal is not accurately cancelled, a larger integrating capacitor $C_i$ is required in the circuitry of the fingerprint sensor to reduce a gain G of the circuitry in FIG. 1, and afterwards, the signal amount as required for digital-to-analog conversion needs to be acquired by increasing the times of integration. As such, the signal-to-noise ratio of the circuitry of the fingerprint sensor is reduced. Further, in addition to the reduction of the signal-to-noise ratio, the overall time of a single fingerprint acquisition is prolonged, and thus the average power consumption of the fingerprint sensor is increased.

In addition to the parasitic capacitor $C_p$, the base capacitor included in the fingerprint capacitor $C_f$ may also cause the base signal. This is because the fingerprint capacitor $C_f$ includes ridge and valley capacitances of a fingerprint, each of which may be equivalent to a base capacitance and an effective capacitance, and the fingerprint detection is mainly based on the effective capacitances included in both the ridge capacitance and the valley capacitance. The base capacitances in the ridge capacitance and the valley capacitance are far greater than the corresponding effective capacitances, such that the base capacitance in the fingerprint capacitor $C_f$ may also generate the base signal. The technical solution as illustrated in FIG. 1 fails to cancel the base signal generated by the base capacitance in the fingerprint capacitor. As such, the base signal may not be thoroughly cancelled. Therefore, the cancellation of the base signal is not sufficiently accurate.

Accordingly, embodiments of the present disclosure hereinafter provide a capacitive fingerprint sensor. The capacitive fingerprint sensor includes: an integrator, a trigger and a base cancelling circuit. The integrator is configured to store charges from a fingerprint capacitor $C_f$ to generate an output signal $V_o$, and transfer the output signal $V_o$ to the trigger. The trigger is configured to trigger the base cancelling circuit to generate a base cancelling signal, and output the base cancelling signal to the integrator if the output signal $V_o$ exceeds a predetermined threshold. The base cancelling signal is used to adjust the output signal $V_o$ of the integrator to fall within the predetermined threshold, so as to increase a dynamic range of the integrator.

Figure 2:
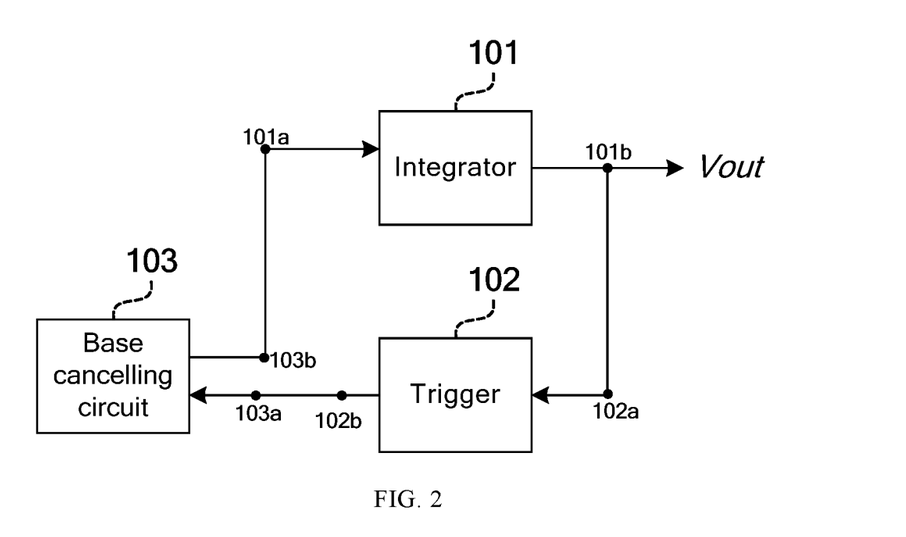
FIG. 2 is a schematic structural diagram of circuit modules of a fingerprint sensor according to a first embodiment of the present disclosure.

FIG. 2 is a schematic structural diagram of circuit modules of a fingerprint sensor according to a first embodiment of the present disclosure. As illustrated in FIG. 2, in this embodiment, the fingerprint sensor includes an integrator 101, a trigger 102 and a base cancelling circuit 103. The integrator 101 includes a first signal input terminal 101a and a first signal output terminal 101b. The trigger 102 includes a second signal input terminal 102a and a second signal output terminal 102b. The base signal cancelling circuit 103 includes a third signal input terminal 103a and a third signal output terminal 103b. The first signal output terminal 101b is connected to the second signal input terminal 102a, the second output terminal 102b is connected to the third signal input terminal 103a, and the third signal output terminal 103b is connected to the first signal input terminal 101a.

The integrator 101 is configured to store charges from the fingerprint capacitor $C_f$ after the fingerprint capacitor $C_f$ is charged during fingerprint detection by the fingerprint sensor, thereby completing a charging-integration process. In addition, each time the charging-integration process is complete, an output signal $V_o$ is generated and then transferred to the trigger 102. Specifically, the output signal $V_o$ is transferred to the second signal input terminal 102a of the trigger 102 via the first signal output terminal 101b of the integrator 101.

The trigger 102 is specifically configured to generate a trigger signal if the output signal $V_o$ exceeds a predetermined threshold. The trigger signal is configured to trigger the base cancelling circuit 103 to generate a base cancelling signal and output the base cancelling signal to the integrator 101. Specifically, the trigger signal is transferred to the third signal input terminal 103a of the base cancelling circuit 103 via the second signal output terminal 102b. The base cancelling signal generated by the base cancelling circuit 103 is transferred to the first signal input terminal 101a of the integrator 101 via the third signal output terminal 103b of the base cancelling circuit 103. The base cancelling signal is used to adjust the output signal $V_o$ of the integrator 101 such that the output signal $V_o$ does not exceed the predetermined threshold, that is, adjust the output signal to fall within the predetermined threshold to increase a dynamic range of the integrator 101. In a specific embodiment, the predetermined threshold may be defined to be greater than a minimum voltage for downward saturation output by the integrator 101.

In this embodiment, the trigger 102 may include a comparator. The comparator is configured to compare the output signal $V_o$ of the integrator 101 with the predetermined threshold. If a comparison result indicates that the output signal $V_o$ of the integrator 101 exceeds the predetermined threshold, the comparator sends a trigger signal to the base cancelling circuit 103. The base cancelling circuit 103 generates the base cancelling signal when being triggered by the trigger signal. Specifically, the base cancelling signal may be a base cancelling voltage. The specific value of the base cancelling voltage may be referenced to the embodiments hereinafter. The base cancelling voltage is output to the first signal input terminal 101a via the third signal output terminal 103b, that is, transferred to the integrator 101, such that the output signal $V_o$ of the integrator 101 does not exceed the predetermined threshold.

In this embodiment, since the base cancelling voltage is known each time, a practical integration voltage value may be obtained via anti-conclusion as long as the number of times of base cancellation is counted and the output signal $V_o$ of the integrator 101 is obtained, and thus the output signal $V_o$ of the integrator is adjusted to maintain falling within the predetermined threshold. Therefore, the technical solution according to this embodiment may ensure that the integration 101 does not reach saturation. That is, the dynamic range output by the fingerprint sensor according to this embodiment may be theoretically infinite.

In this embodiment, the integrator 101 and the base cancelling circuit 103 may be practiced with reference to the capacitances formed by different electrode plates in the semiconductor device and the fingerprint sensor. The details may be given in the embodiments hereinafter.

Figure 3:
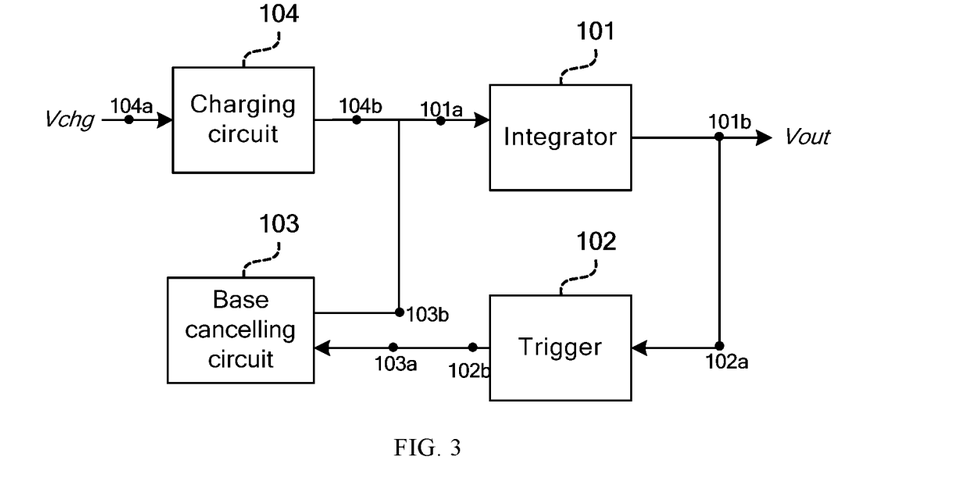
FIG. 3 is a schematic structural diagram of circuit modules of a fingerprint sensor according to a second embodiment of the present disclosure.

FIG. 3 is a schematic structural diagram of circuit modules of a fingerprint sensor according to a second embodiment of the present disclosure. As illustrated in FIG. 3, a charging circuit 104 is additionally arranged on the basis of the first embodiment. The charging circuit 104 is configured to charge or discharge the fingerprint capacitor $C_f$. The charging circuit 104 includes a fourth signal input terminal 104a and a fourth signal output terminal 104b. The input terminal of the charging circuit is connected to the power supply voltage $V_c$, which is specifically practiced by connecting the fourth signal input terminal 104a to the power supply voltage $V_c$. In the present application, the power supply voltage $V_c$ is used as a charging voltage of the charging circuit 104. A signal output terminal of the charging circuit 104 is connected to an input terminal of the integrator 101, which is specifically practiced by connecting the fourth signal output terminal 104b to the first signal input terminal 101a of the integrator 101.

During an integration process of the integrator 101, charges in the fingerprint capacitor $C_f$ are transferred to the integrator 101. However, in this embodiment, since the base cancelling circuit 103 is included, the base cancelling circuit 103 may be triggered to generate a base cancelling signal. The base cancelling signal may offset a portion of the output signal $V_o$ of the integrator 101 that exceeds the predetermined threshold caused by transfer of the corresponding charges from the base capacitor and the parasitic capacitor $C_p$ to the integrator 101, such that the output of the integrator 101 does not exceed the predetermined threshold.

Figure 4:
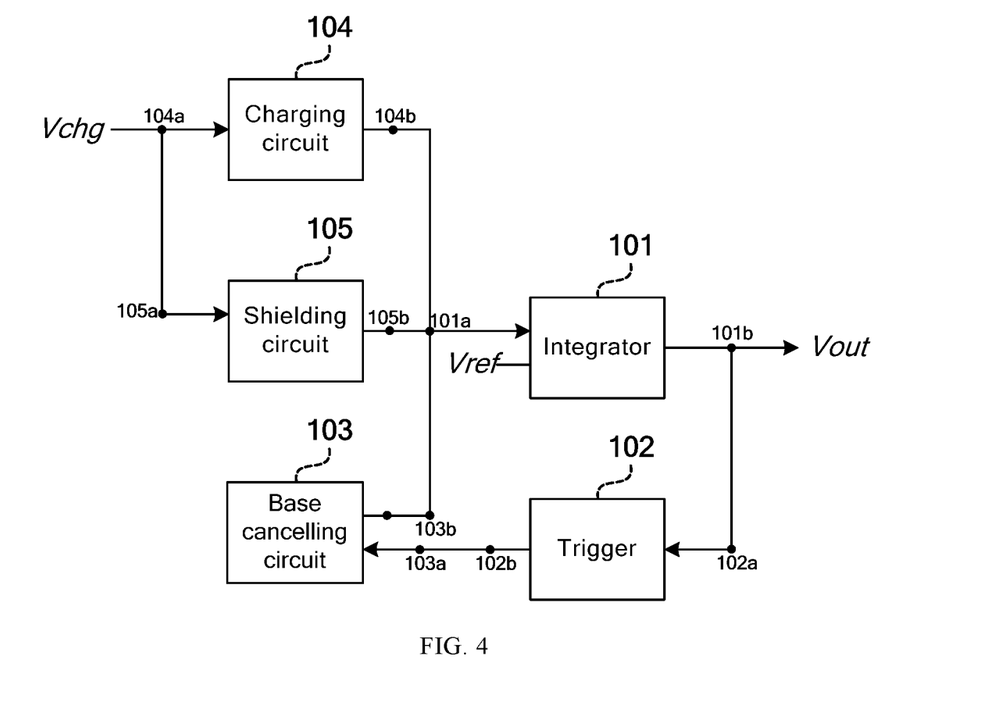
FIG. 4 is a schematic structural diagram of circuitry modules of a fingerprint sensor according to a third embodiment of the present disclosure.

FIG. 4 is a schematic structural diagram of circuit modules of a fingerprint sensor according to a third embodiment of the present disclosure. As illustrated in FIG. 4, a shielding circuit 105 is additionally arranged on the basis of FIG. 3. The shielding circuit 105 is connected to the charging circuit 104 in parallel, and is configured to cancel or reduce the charges transferred from the parasitic capacitor $C_p$ to the integrator 101. In this embodiment, an input terminal of the shielding circuit 105 is connected to the power supply voltage $V_c$, which is specifically practiced by connecting a fifth signal input terminal 105a of the shielding circuit 105 to the power supply voltage $V_c$. An output terminal of the shielding circuit 105 is connected to the parasitic capacitor $C_p$ (not illustrated in the drawings), which is specifically practiced by connecting a fifth signal output terminal 105b of the shielding circuit 105 to the parasitic capacitor $C_p$. In addition, the fifth signal output terminal 105b of the shielding circuit 105 is further connected to the first signal input terminal 101a of the integrator 101.

In this embodiment, the shielding circuit 105 additionally arranged in the circuitry of the fingerprint sensor, and charging or discharging the parasitic capacitor $C_p$ is implemented by using the shielding circuit 105. In this way, the charges in the parasitic capacitor $C_p$ are prevented from being transferring to the integrator 101, which effectively mitigates the impact caused by the parasitic capacitor $C_p$ to the output signal $V_o$ of the integrator 101. Therefore, the output signal $V_o$ of the integrator 101 may be further prevented from exceeding the predetermined threshold, such that the dynamic range output by the circuitry is effectively increased.

In this embodiment, the shielding circuit 105 may be specifically formed by a semiconductor device. The details may be referenced to the illustrative explanations given in the embodiments hereinafter.

Figure 5:
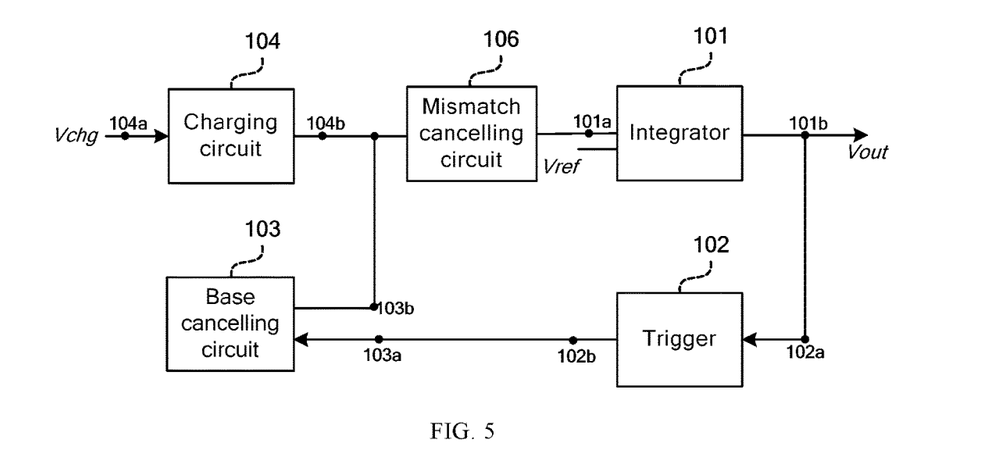
FIG. 5 is a schematic structural diagram of circuit modules of a fingerprint sensor according to a fourth embodiment of the present disclosure.

FIG. 5 is a schematic structural diagram of circuit modules of a fingerprint sensor according to a fourth embodiment of the present disclosure. As illustrated in FIG. 5, the integrator 101 is connected to the reference voltage $V_r$ based on a negative feedback mechanism. In this embodiment, a mismatch cancelling circuit 106 is additionally arranged on the basis of the embodiment illustrated in FIG. 3. The mismatch cancelling circuit 106 is arranged between the integrator 101 and the base cancelling circuit 103, and is configured to cancel a mismatch between the integrator 101 and the reference voltage $V_r$, which is specifically practiced by arranging the mismatch cancelling circuit 106 between the first signal input terminal 101a of the integrator 101 and the third signal output terminal 103b of the base cancelling circuit 103.

In a practice operation process, since the integrator 101 may mismatch with the reference voltage $V_r$, the dynamic range of the output signal $V_o$ of the integrator 101 may be generally smaller. Therefore, in this embodiment, the mismatch cancelling circuit 106 is additionally arranged on the basis of FIG. 1, and is configured to cancel the possible mismatch between the integrator 101 and the reference voltage $V_r$. The specific technique for implementing the mismatch cancelling circuit 106 may include automatic zero setting, correlated double sampling, chopping and the like, to further improve a match between the channels of the fingerprint sensor.

Figure 6:
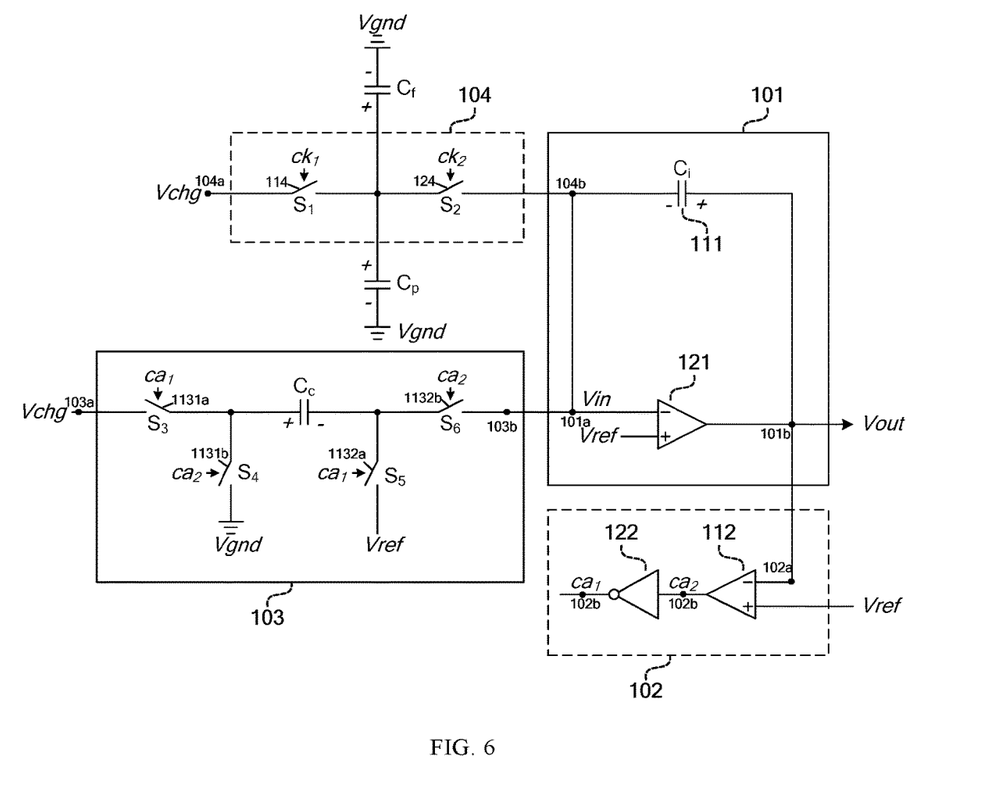
FIG. 6 is a schematic structural diagram of a specific circuitry of a fingerprint sensor according to a fifth embodiment of the present disclosure.

FIG. 6 is a schematic structural diagram of a specific circuitry of a fingerprint sensor according to a fifth embodiment of the present disclosure. As illustrated in FIG. 6, in this embodiment, units of the fingerprint sensor have the following specific structures:

The integrator 101 includes an integrating capacitor 111 and an amplifier 121. The integrating capacitor 111 is configured to store charges from the fingerprint capacitor $C_f$. The amplifier 121 may be a differential input and single output amplifier 121, which is hereinafter referred to as a first differential input and single output amplifier 121. An output terminal of the first differential input and single output amplifier 121 is used as the first signal output terminal 101b, and is connected to the trigger 102 to output the output signal $V_o$ to the trigger 102. A non-inverting input terminal (which is also referred to as a positive input terminal) of the first differential input and single output amplifier 121 is connected to the reference voltage $V_r$, and an inverting input terminal (which is also referred to as a negative input terminal) is used as the input terminal of the integrator 101 and is connected to the fingerprint capacitor $C_f$. The integrating capacitor 111 is connected between the inverting input terminal and the output terminal of the first differential input and single output amplifier 121, which is specifically practiced by connecting the integrating capacitor 111 between the first signal input terminal 101a and the first signal output terminal 101b. Specifically, a positive electrode plate of the integrating capacitor 111 is connected to the first signal output terminal 101b, and a negative electrode plate of the integrating capacitor 111 is connected to the first signal input terminal 101a.

The trigger 102 includes a comparator 112 and an inverter 122 that are connected in series. In this embodiment, the comparator 112 may employ a differential input and single output amplifier, which is hereinafter referred to as a second differential input and single output amplifier 121. The inverter 122 may employ a single input and single output inverter, which is hereinafter referred to as a single input-single output inverter 122. An inverting input terminal of the second differential input and single output amplifier 121 is used as the second signal input terminal 102a, and is connected to the first signal output terminal 101b of the integrator 101 and thus connected to the integrator 101 to receive the output signal $V_o$. A non-inverting input terminal of the second differential input and single output amplifier 121 is connected to the reference voltage $V_r$, and the reference voltage $V_r$ is used as a predetermined threshold of the trigger 102.

In this embodiment, the trigger 102 may include two switch control terminals: a first switch control terminal and a second switch control terminal. The two output terminals are configured as the second signal output terminal 102b of the trigger 102. The trigger signal output by the trigger includes a first switch control signal and a second switch control signal. The first switch control signal and the second switch control signal are inverse to each other. For example, in this embodiment, the output terminal of the single input and single output inverter 122 may be used as the first switch control terminal, and may be configured to output the first switch control signal $Ca_1$ (or referred to as a first trigger signal). The output terminal of the amplifier 121 may be used as the second switch control terminal, and may be configured to output the second switch control signal $Ca_2$ (or referred to as a second trigger signal).

In this embodiment, the base cancelling circuit 103 specifically includes a switch circuit and a base cancelling capacitor $C_c$. The switch circuit is connected to the base cancelling capacitor $C_c$, and is configured to perform a switch-on or switch-off operation when being triggered by the trigger signal, such that the base cancelling capacitor $C_c$ is charged or discharged to generate the base cancelling signal.

For example, in this embodiment, the switch circuit in the base cancelling circuit 103 may specifically include a first switch 1131a (or marked as $S_3$), a second switch 1131b (or marked as $S_4$), a third switch 1132a (or marked as $S_5$), and a fourth switch 1132b (or marked as $S_6$). One terminal of the first switch 1131a is used as the third signal input terminal 103a and is connected to the power supply voltage $V_c$, the other terminal of the first switch 1131a is connected to one terminal of the second switch 1131b and is connected to a positive electrode plate of the base cancelling capacitor $C_c$, and the other terminal of the second switch 1131b is connected to the system ground $V_g$. One terminal of the third switch 1132a is connected to the reference voltage $V_r$, the other terminal of the third switch 1132a is connected to one terminal of the fourth switch 1132b and is connected to a negative electrode plate of the base cancelling capacitor $C_c$, and the other terminal of the fourth switch 1132b is used as the third signal output terminal 103b and is configured to output the base cancelling signal.

In this embodiment, the first switch 1131a and the third switch 1132a are configured to receive the first switch control signal $Ca_1$ (or referred to as the first trigger signal), and perform a switch-on or switch-off operation under control of the first switch control signal $Ca_1$; and the second switch 1131b and the fourth switch 1132b are configured to receive the second switch control signal $Ca_2$ (or referred to as the second trigger signal), and perform a switch-on or switch-off operation under control of the second switch control signal $Ca_2$. That is, in this embodiment, the trigger signal output by the trigger 102 to the base cancelling circuit 103 specifically includes the first switch control signal $Ca_1$ (or referred to as the first trigger signal) and the second switch control signal $Ca_2$ (or referred to as the second trigger signal), which are inverse to each other.

The charging circuit 104 is configured to charge or discharge the fingerprint capacitor $C_f$; the input terminal of the charging circuit 104 is connected to the power supply voltage $V_c$, and the power supply voltage $V_c$ is used as a charging voltage. The output terminal of the charging circuit 104 is connected to the input terminal of the integrator 101.

Specifically, the charging circuit 104 includes a fifth switch 114 (or marked as $S_1$) and a sixth switch 124 (or marked as $S_2$). One terminal of the fifth switch 114 is used as the fourth signal input terminal 104a, that is, the input terminal of the charging circuit, and is connected to the power supply voltage $V_c$; the other terminal of the fifth switch 114 is respectively connected the positive electrode plates of the fingerprint capacitor $C_f$ and the parasitic capacitor $C_p$. Moreover, one terminal of the sixth switch 124 is respectively connected to the positive electrode plates of the fingerprint capacitor $C_f$ and the parasitic capacitor $C_p$, and the other terminal of the sixth switch 124 is used as the fourth signal output terminal 104b and is connected to the first signal output terminal 101b, that is, used as the output terminal of the charging circuit 104 and connected to the integrator 101. A negative electrode plate of the parasitic capacitor $C_p$ and a negative electrode plate of the fingerprint capacitor $C_f$ are connected to the system ground $V_g$.

The current operation process of the fingerprint detection in this embodiment is as follows:

The fifth switch 114 ($S_1$) and the sixth switch 124 ($S_2$) in the charging circuit 104 are controlled by the first clock signal $ck_1$ and the second clock signal $ck_2$. When the first clock signal $ck_1$ is high whereas the second clock signal $ck_2$ is low, the fifth switch 114 ($S_1$) is turned on whereas the sixth switch 124 ($S_2$) is turned off. In this case, the positive electrode plates of the fingerprint capacitor $C_f$ and the parasitic capacitor $C_p$ are charged by the power supply voltage $V_c$.

When the second clock $ck_2$ is high whereas the first clock signal $ck_1$ is low, the fifth switch 114 ($S_1$) is turned off whereas the sixth switch 124 ($S_2$) is turned on. In this case, a specific proportion of the charges in the fingerprint capacitor $C_f$ are transferred to the integrator capacitor $C_i$, thereby completing an integration process. A voltage increment $\Delta V_{o,cf}$ reflected by the output of the integrator in the charging-integration process is given by formula (3):

$$\Delta V_{o,cf} = (V_r - V_c)\frac{C_f + C_p}{C_i} \quad (3)$$

The trigger 102 compares the output signal $V_o$ of the integrator 101 with the reference voltage $V_r$. If the output signal $V_o$ does not exceed the reference voltage $V_r$, the trigger signal output by the trigger 102 specifically indicates that the first switch control signal $Ca_1$ (or referred to as the first trigger signal) is high whereas the second control signal $Ca_2$ (or referred to as the second trigger signal) is low. If the output signal $V_o$ exceeds the reference voltage $V_r$, the trigger signal output by the trigger 102 specifically indicates that the first switch control signal $Ca_1$ (or referred to as the first trigger signal) is low whereas the second switch control signal $Ca_2$ (referred to as the second trigger signal) is high.

In the base cancelling circuit 103, when the first switch control signal $Ca_1$ (or referred to as the first trigger signal) is high, the first switch 1131a ($S_3$) and the third switch 1132a ($S_5$) are turned on whereas the second switch 1131b ($S_4$) and the fourth switch 1132b ($S_6$) are turned off. In this case, the positive electrode plate of the base cancelling capacitor $C_c$ is connected to the power supply voltage $V_c$, and the negative electrode plate thereof is connected to the reference voltage $V_r$. When the second switch control signal $Ca_2$ (or referred to as the second trigger signal) is high, the first switch 1131a ($S_3$) and the third switch 1132a ($S_5$) are turned off whereas the second switch 1131b ($S_4$) and the fourth switch 1132b ($S_6$) are turned on. In this case, the negative electrode plate of the base cancelling capacitor $C_c$ is connected to the first signal input terminal 101a of the integrator 101, and the positive electrode plate thereof is connected to the system ground $V_g$. As such, a base cancellation process is complete. A voltage increment $\Delta V_{o,cc}$ reflected by the output of the base cancelling capacitor $C_c$ in the base cancellation process is given by formula (4):

$$\Delta V_{o,cc} = V_c \frac{C_c}{C_i}, \quad (4)$$

According to formula (4), the base cancelling voltage is not related to the reference voltage $V_r$, but is only related to $C_c/C_i$ and $V_c$. In addition, $C_c/C_i$ and $V_c$ are both known. Therefore, the total voltage for the base cancellation may be obtained via anti-conclusion as long as the number of times of base cancellation is acquired.

Therefore, upon n times of integrations, m times of base cancellations are performed. In this case, the output signal $V_{or}$ of the integrator obtained by practical sampling may be represented by formula (5). A voltage difference $V_{or,p-v}$ between the fingerprint ridge voltage and the fingerprint valley voltage, which is obtained by practical sampling, may be represented by formula (6). In formula (6), n and m satisfy a relationship of $0 \leq n\Delta V_{o,cf} + m\Delta V_{o,cc} \leq \Delta V_{o,cc}$, and n is greater than or equal to m.

$$V_{or} = n\Delta V_{o,cf} + m\Delta V_{o,cc} + V_r, \quad (5)$$

$$V_{or,p-v} = n\Delta V_{o,\Delta cf} + (m_p - m_v)\Delta V_{o,cc}, \quad (6)$$

Since $m_p$, $m_v$, $V_s$ and $C_c/C_i$ in formula (6) are all known, $m_p$ and $m_v$ respectively denote the number of times that the ridge capacitance and valley capacitance in the fingerprint capacitor $C_f$ involve in the base cancellation.

Therefore, a voltage difference $V_{or,p-v}$ between the fingerprint ridge voltage and the fingerprint valley voltage in the case of an infinite output dynamic range can be obtained by subtracting the base cancelling voltage difference $(m_p - m_v)\Delta V_{o,cc}$ from the actual voltage difference $V_{oi,p-v}$, as illustrated by formula (7):

$$V_{oi,p-v} = V_{or,p-v} - (m_p - m_v)\Delta V_{o,cc} = n(V_r - V_c)\frac{\Delta C_f}{C_i} \quad (7)$$

As seen from formula (7), the actual voltage difference $V_{or,p-v}$ is irrelevant to the base capacitances in the parasitic capacitor $C_p$ and the fingerprint capacitor $C_f$, but is only related to a difference $\Delta C_f$ between the ridge capacitance and the valley capacitance in the fingerprint capacitor $C_f$ and the integrator capacitor $C_i$. Therefore, the output dynamic range of the integrator 101 is infinitely expanded. Since the dynamic range is increased, the integrator 101 may employ a higher gain. After the gain is increased, the same signal amount is obtained, and the output signal-to-noise ratio is also increased. Furthermore, the noise input by the integrator 101 is also equivalently reduced. Therefore, the precision requirement of the ADC maybe effectively reduced.

Figure 7:
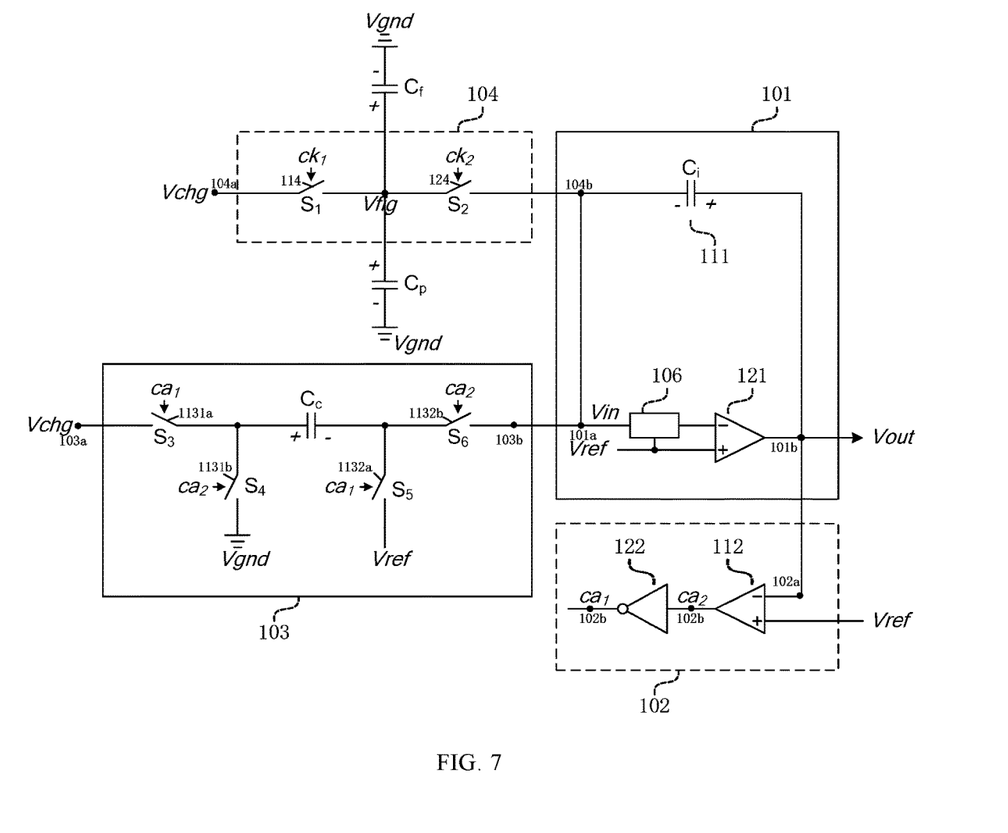
FIG. 7 is a schematic structural diagram of a specific circuitry of a fingerprint sensor according to a sixth embodiment of the present disclosure.

FIG. 7 is a schematic structural diagram of a specific circuitry of a fingerprint sensor according to a sixth embodiment of the present disclosure. As illustrated in FIG. 7, a mismatch cancelling circuit 106 is additionally arranged in the fingerprint sensor as illustrated in the sixth embodiment on the basis of FIG. 6. The mismatch cancelling circuit 106 is arranged between the amplifier 121 and the base cancelling circuit 103, and is configured to cancel a mismatch between the integrator 101 and the reference voltage $V_r$.

With respect to the circuitry as illustrated in FIG. 6, assuming that a mismatch amount between the amplifier 121 and the reference voltage $V_r$ is $\sigma V_{r,a2r}$, upon n times of integrations of the integrator 101, in an ideal state, a relationship of a voltage difference $V_{oi,p-v}(n)$ between the ridge voltage and the valley voltage is given by formula (8), and a ratio $\gamma_{a2r}$ of an valid signal $$(V_r - V_s)\frac{\Delta C_f}{C_i}$$

to a mismatch signal $$\sigma V_{a2r}\frac{C_f + C_p}{C_i}$$

is given by formula (9):

$$V_{oi,p-v}(n) = n\left[(V_r - V_s)\frac{\Delta C_f}{C_i} + \sigma V_{a2r}\frac{C_f + C_p}{C_i}\right], \quad (8)$$

$$\gamma_{a2r} = \frac{V_r - V_s}{\sigma V_{a2r}} \cdot \frac{\Delta C_f}{C_f + C_p}, \quad (9)$$

As seen from formula (9), in practice, since $(V_r-V_s)/\sigma V_{a2r} > 100$ and $\Delta C_f/(C_f+C_p) \approx 1/100$, the mismatch signal is substantially in the same magnitude as the valid signal, or even greater than the desired valid signal. Therefore, if no processing is performed, the output signal of the integrator 101 may be subjected to an offset.

Therefore, in this embodiment, the mismatch cancelling circuit 106 is additionally arranged in the integrator 101. If the amplifier 121 employs a differential input and single output amplifier, the third signal output terminal 103b of the base cancelling circuit 103 is connected to the inverting input terminal of the amplifier 121 via the mismatch cancelling circuit 106.

Specifically, in an embodiment, the mismatch cancelling circuit 106 may include two input terminals. One input terminal is connected to the third signal output terminal 103b, and the other input terminal is connected to the reference voltage $V_r$. In addition, the output terminal of the mismatch cancelling circuit 106 may be connected to the inverting input terminal of the amplifier 121. As described above, the mismatch cancelling circuit 106 may be specifically practiced in a plurality of ways, for example, commonly used techniques including automatic zero setting, correlated double sampling, chopping and the like.

Figure 8:
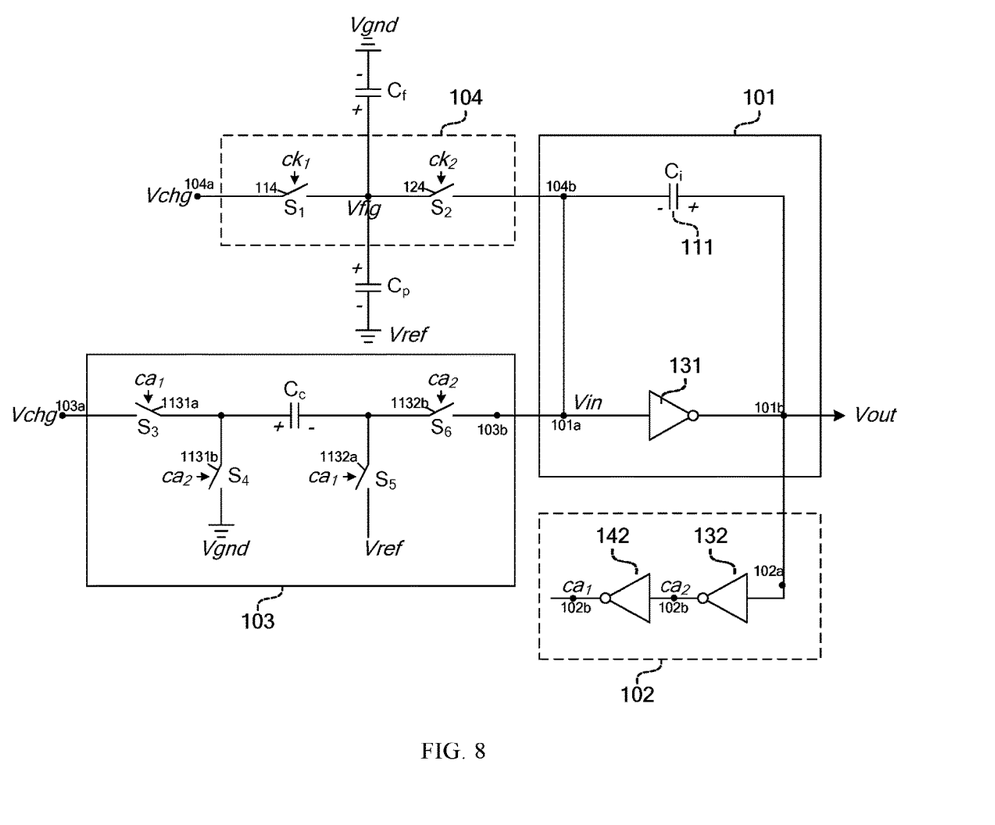
FIG. 8 is a schematic structural diagram of a specific circuitry of a fingerprint sensor according to a seventh embodiment of the present disclosure.

FIG. 8 is a schematic structural diagram of a specific circuitry of a fingerprint sensor according to a seventh embodiment of the present disclosure. As illustrated in FIG. 8, the fingerprint sensor according to the seventh embodiment is different from that disclosed in the above embodiments mainly in that in this embodiment, the integrator 101 includes an integrating capacitor 111 and a first inverter 131. The first inverter 131 is a single input and single output inverter. An output terminal of the first inverter 131 is used as the output terminal of the integrator 101, and is connected to the trigger 102 to output the output signal $V_o$ to the trigger 102. An input terminal of the first inverter 131 is used as the input terminal of the integrator 101, and is connected to the fingerprint capacitor $C_f$. The integrating capacitor 111 is connected between the first signal output terminal 101b and the first signal input terminal 101a, that is, between the output terminal and the input terminal of the first inverter 131.

In this embodiment, the trigger 102 includes a second inverter 132 and a third inverter 142 that are connected in series. An input terminal of the second inverter 132 is connected to the output terminal of the integrator 101. The two inverters 132 and 142 may be both single input and single output inverters. An output terminal of the third inverter 142 is used as a first switch control terminal of the trigger 102, and is configured to output the first switch control signal $Ca_1$ (or referred to as the first trigger signal). An output terminal of the second inverter 132 is used as a second switch control terminal of the trigger, and is configured to output the second switch control signal $Ca_2$ (or referred to as the second trigger signal). That is, in this embodiment, an input terminal of the third inverter 142 is used as the second signal input terminal 102a of the trigger 102, and the second signal output terminal 102b of the trigger 102 specifically includes the first switch control terminal and the second switch control terminal.

Compared with the above embodiments, in this embodiment, since the integrator 101 uses the single input and single output inverter 131 to replace the amplifier 121 in other embodiments, the number of pins which contribute to the noise may be reduced, and moreover, the noise introduced by the referenced voltage $V_r$ may be cancelled, such that the signal-to-noise ratio (SNR) output by the integrator 101 may be increased. In addition, the single input and single output inverter 131 may consume only half of the power consumption when acquiring the same bandwidth of the differential input structure. Therefore, the entire power consumption of the fingerprint sensor is effectively lowered, and thus the total time of a single fingerprint acquisition is shortened. Furthermore, since the used the single input and single output inverter 131 has a simpler structure relative to the amplifier 121, the circuitry area of the fingerprint sensor is also reduced.

Figure 9:
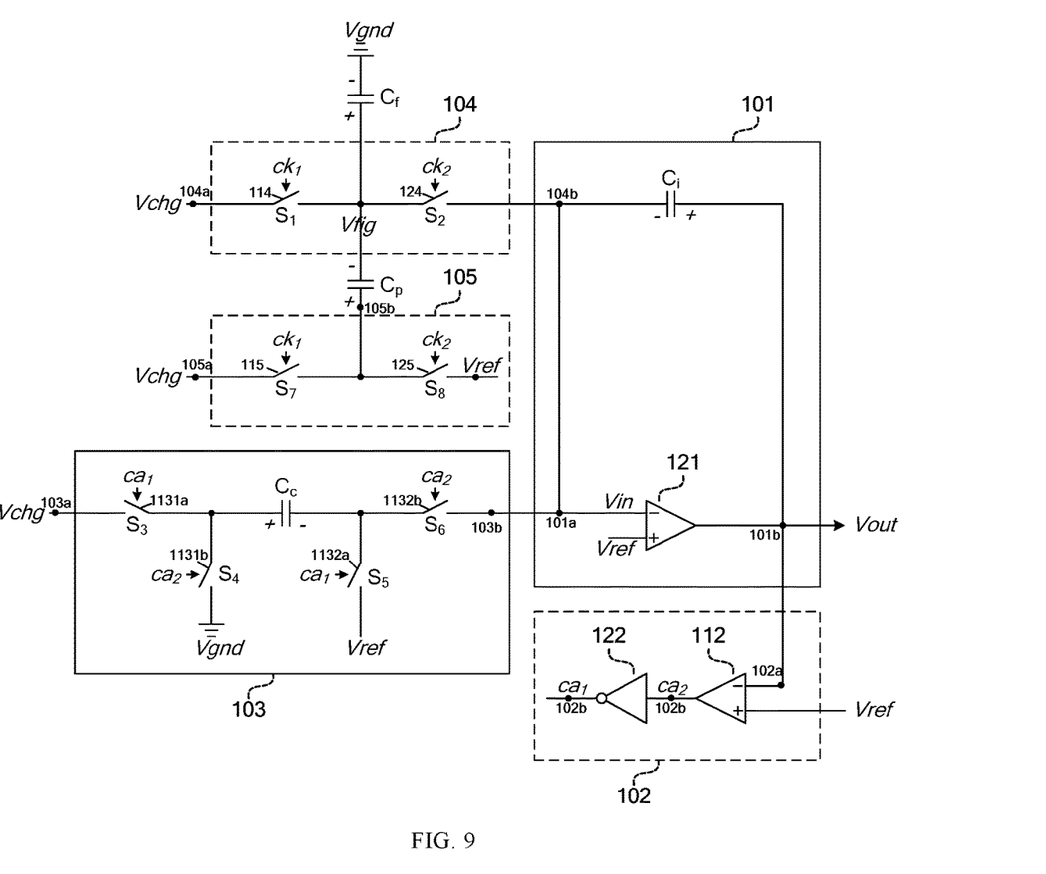
FIG. 9 is a schematic structural diagram of a specific circuitry of a fingerprint sensor according to an eighth embodiment of the present disclosure.

FIG. 9 is a schematic structural diagram of a specific circuitry of a fingerprint sensor according to an eighth embodiment of the present disclosure. As illustrated in FIG. 9, a specific circuitry of a shielding circuit 105 is additionally arranged in the fingerprint sensor according to the eighth embodiment on the basis of FIG. 6. The shielding circuit 105 includes a fifth signal input terminal 105a and a fifth signal output terminal 105b. Specifically, the shielding circuit 105 includes a seventh switch 115 (or marked as $S_7$) and an eighth switch 125 (or marked as $S_8$). One terminal of the seventh switch 115 is used as the fifth signal input terminal 105a, that is, an input terminal of the shielding circuit 105, and is connected to the power supply voltage $V_c$; and the other terminal of the seventh switch 115 is connected to the parasitic capacitor $C_p$ via the fifth signal output terminal 105b, and is further connected to one terminal of the eighth switch 125. Further, the other terminal of the eighth switch 125 is connected to the reference voltage $V_r$. In addition, in this embodiment, on and off states of the seventh switch 115 and the eighth switch 125 are also respectively controlled by the first clock signal $ck_1$ and the second clock signal $ck_2$.

In this embodiment, the trigger 102 includes the comparator 112 and the inverter 122 that are connected in series as described in the embodiment illustrated in FIG. 7, which are thus not described herein any further. The operation process of the fingerprint sensor according to this embodiment is as follows:

When the first clock signal ck1 is high, the fifth switch 114 (S1) and the seventh switch 115 (S7) are turned on whereas the sixth switch 124 (S2) and the eighth switch 125 (S8) are turned off. In this case, the positive electrode plate of the fingerprint capacitor $C_f$ and the two terminals of the parasitic capacitor $C_p$ are all connected to the power supply voltage $V_c$. Since the voltages at the two terminals of the parasitic capacitor $C_p$ are the same, the parasitic capacitor $C_p$ has no charge.

When the second clock signal $ck_2$ is high, the fifth switch 114 ($S_1$) and the seventh switch 115 ($S_7$) are turned off whereas the sixth switch 124 ($S_2$) and the eighth switch 125 ($S_8$) are turned on. In this case, a portion of charges in the fingerprint capacitor $C_f$ are transferred to the integrator 101. Since the positive terminal and negative terminal of the amplifier 121 are virtually shorted, a voltage $V_{in}$ of the inverting input terminal of the amplifier 121 is loaded to the positive electrode plate of the fingerprint capacitor $C_f$, such that the voltage at the positive electrode plate of the fingerprint capacitor $C_f$ is equal to the reference voltage $V_r$, and hence the voltage at the negative electrode plate of the parasitic capacitor $C_p$ is also equal to the reference voltage $V_r$. Therefore, the parasitic capacitor $C_p$ in this case still has no charge. Accordingly, the variation amount $\Delta V_{o,cf}$ of the output signal in a single integration of the integrator is given by formula (10). As seen from formula (10), since the shielding circuit 105 is used, the impact caused by the parasitic capacitor $C_p$ is completely cancelled.

$$\Delta V_{o,cf} = (V_r - V_c)\frac{C_f}{C_i}, \quad (10)$$

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored on a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A capacitive fingerprint sensor, comprising:
a fingerprint capacitor,
an integrator,
a trigger, and
a base cancelling circuit;
wherein the integrator is configured to store charges from the fingerprint capacitor to generate an output signal and transfer the output signal to the trigger;
the trigger is configured to trigger the base cancelling circuit to generate a base cancelling signal and output the base cancelling signal to the integrator when the output signal exceeds a predetermined threshold; and
the base cancelling circuit comprises a switch circuit and a base cancelling capacitor, wherein the switch circuit comprises a first switch, a second switch, a third switch and a fourth switch; wherein one terminal of the first switch is connected to a power supply voltage and the other terminal of the first switch is connected to one terminal of the second switch and a positive electrode plate of the base cancelling capacitor, the other terminal of the second switch is connected to a system ground, one terminal of the third switch is connected to a reference voltage and the other terminal of the third switch is connected to one terminal of the fourth switch and connected to a negative electrode plate of the base cancelling capacitor, and the other terminal of the fourth switch is configured to output the base cancelling signal, and the base cancelling signal is used to adjust the output signal of the integrator to fall within the predetermined threshold to increase a dynamic range of the integrator.

2. The capacitive fingerprint sensor according to claim 1, wherein the trigger is configured to generate a trigger signal if the output signal of the integrator exceeds the predetermined threshold, and the base cancelling circuit is configured to generate the base cancelling signal and output the base cancelling signal to the integrator when being triggered by the trigger signal.

3. The capacitive fingerprint sensor according to claim 2, wherein the trigger signal output by the trigger comprises a first switch control signal and a second switch control signal, wherein the first switch control signal and the second switch control signal are inverse to each other.

4. The capacitive fingerprint sensor according to claim 3, wherein the switch circuit is configured to make a switch-on or switch-off action when being triggered by the trigger signal such, such that the base cancelling capacitor performs charging or discharging to generate the base cancelling signal.

5. The capacitive fingerprint sensor according to claim 4, wherein the first switch and the third switch are configured to receive the first switch control signal and make a switch-on or switch-off action under control of the first switch control signal, and the second switch and the fourth switch are configured to receive the second switch control signal and make a switch-on or switch-off action under control of the second switch control signal.

6. The capacitive fingerprint sensor according to claim 3, wherein the trigger comprises a comparator and an inverter that are connected in series; wherein an inverting input terminal of the comparator is connected to the integrator to receive the output signal, and a non-inverting input terminal of the comparator is connected to a reference voltage, the value of the reference voltage being the predetermined threshold; an output terminal of the inverter is used as a first switch control terminal, and is configured to output the first switch control signal; and an output terminal of the comparator is used as a second switch control terminal, and is configured to output the second switch control signal.

7. The capacitive fingerprint sensor according to claim 3, wherein the integrator comprises an integrating capacitor and an amplifier; wherein the integrating capacitor is configured to store charges from the fingerprint capacitor, a non-inverting input terminal of the amplifier is connected to a reference voltage, the inverting input terminal of the amplifier is used as an input terminal of the integrator and connected to the fingerprint capacitor, and an output terminal of the amplifier is connected to the trigger to output the output signal to the trigger, and the integrating capacitor is connected between the negative input terminal and the output terminal of the amplifier.

8. The capacitive fingerprint sensor according to claim 7, further comprising a mismatch cancelling circuit; wherein the mismatch cancelling circuit is arranged between the amplifier and the base cancelling circuit, and is configured to cancel a mismatch between the integrator and the reference voltage.

9. The capacitive fingerprint sensor according to claim 3, wherein the integrator comprises an integrating capacitor and a first inverter; wherein the integrating capacitor is configured to store charges from the fingerprint capacitor, an output terminal of the first inverter is connected to the trigger to output the output signal to the trigger, an input terminal of the first inverter is used as an input terminal of the integrator and is connected to the fingerprint capacitor, and the integrating capacitor is connected between the output terminal and the input terminal of the first inverter.

10. The capacitive fingerprint sensor according to claim 9, wherein the trigger comprises a second inverter and a third inverter that are connected in series; wherein an input terminal of the third inverter is connected to an output terminal of the integrator, an output terminal of the third inverter is used as a first switch control terminal and is configured to output the first switch control signal, and an output terminal of the second inverter is used as a second switch control terminal and is configured to output the second switch control signal.

11. The capacitive fingerprint sensor according to claim 1, further comprising a charging circuit; wherein the charging circuit is configured to charge or discharge the fingerprint capacitor, an input terminal of the charging circuit is connected to a power supply voltage, the power supply voltage being used as a charging voltage, and a signal output terminal of the charging circuit is connected to the input terminal of the integrator.

12. The capacitive fingerprint sensor according to claim 11, wherein the charging circuit comprises a fifth switch and a sixth switch; wherein one terminal of the fifth switch is used as the input terminal of the charging circuit and is connected to the power supply voltage, and the other terminal of the fifth switch is connected to positive electrode plates of the fingerprint capacitor and a parasitic capacitor respectively; one terminal of the sixth switch is connected to the positive electrode plates of the fingerprint capacitor and the parasitic capacitor, and the other terminal of the sixth switch is used as the output terminal of the charging circuit and is connected to the integrator; and a negative electrode plate of the parasitic capacitor and a negative electrode plate of the fingerprint capacitor are both connected to the system ground.

13. The capacitive fingerprint sensor according to claim 12, further comprising a shielding circuit; wherein an input terminal of the shielding circuit is connected to the power supply voltage, and an output terminal of the shielding circuit is connected to the parasitic capacitor; and the shielding circuit is configured to cancel or relief charges transferred from the parasitic capacitor to the integrator.

14. The capacitive fingerprint sensor according to claim 13, wherein the shielding circuit comprises a seventh switch and an eighth switch; wherein one terminal of the seventh switch is used as the input terminal of the shielding circuit, and the other terminal of the seventh switch is connected to the parasitic capacitor and is connected to one terminal of the eighth switch; and the other terminal of the eighth switch is connected to the reference voltage.

\* \* \* \* \*